UNITED STATES PATENT OFFICE.

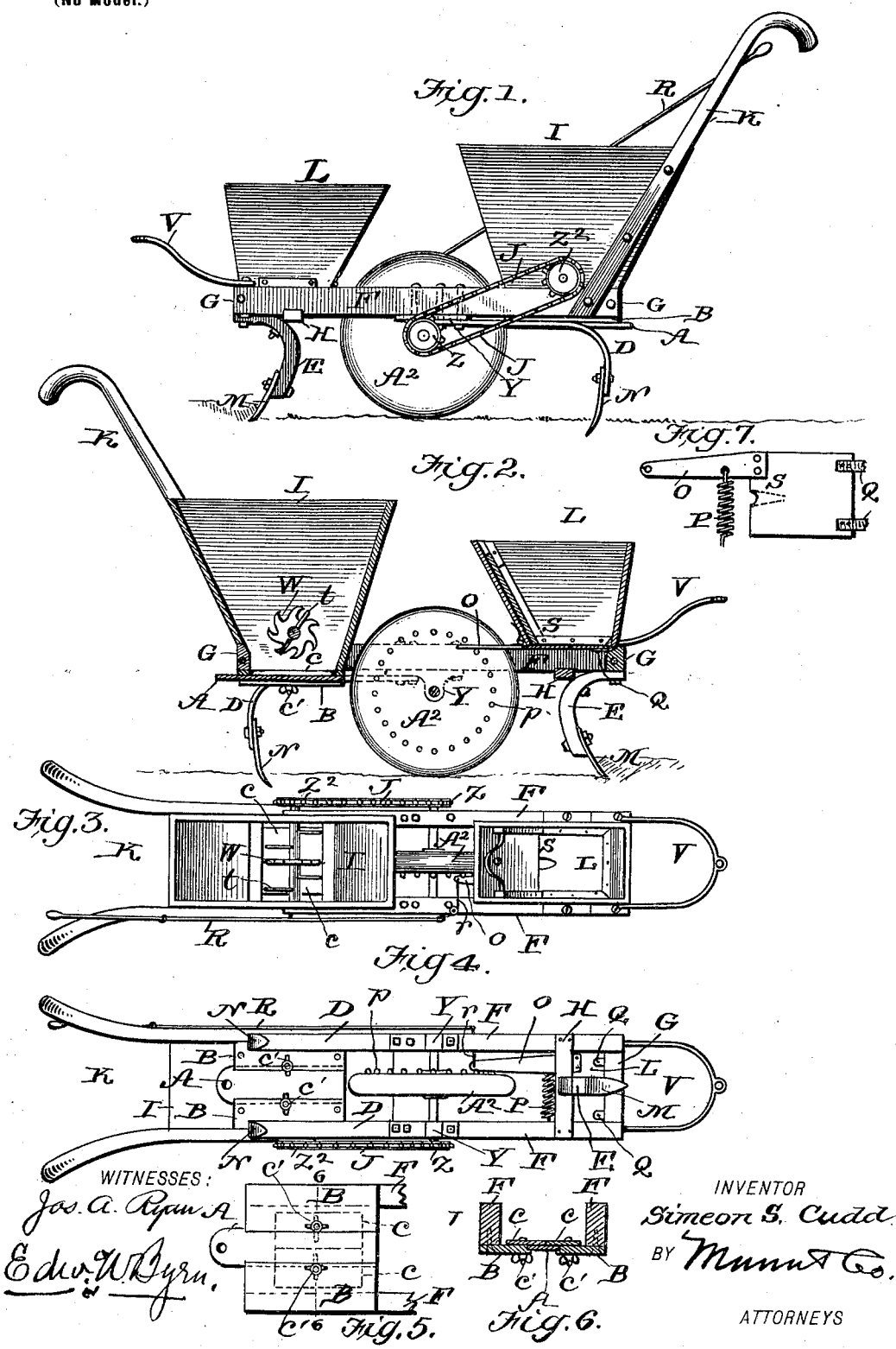

SIMEON SCOVE CUDD, OF KELTON, SOUTH CAROLINA.

COMBINED COTTON-PLANTER AND GUANO-DISTRIBUTER.

SPECIFICATION forming part of Letters Patent No. 672,355, dated April 16, 1901.

Application filed October 30, 1900. Serial No. 34,972. (No model.)

*To all whom it may concern:*

Be it known that I, SIMEON SCOVE CUDD, of Kelton, in the county of Union and State of South Carolina, have invented a new and useful Improvement in Cotton-Planters and Guano-Distributers, of which the following is a specification.

My invention is designed to provide a simple and practical seed-planter and fertilizer-distributer designed especially for planting cotton-seed, but applicable to other kinds of seed as well.

It consists in the peculiar construction and arrangement of the parts of the device, as will be hereinafter fully described with reference to the drawings, in which—

Figure 1 is a side elevation. Fig. 2 is a vertical longitudinal section. Fig. 3 is a plan view. Fig. 4 is an inverted plan view. Fig. 5 is an underneath detail plan view of the bottom of the seedbox. Fig. 6 is a cross-section of the same on line 6 6 of Fig. 5, and Fig. 7 is a bottom view of the shaking-shoe of the fertilizer-box.

F F G G represent a rectangular frame, of which F F are the side bars and G G the end or cross bars. To the middle of the under side of the frame-bars F F are bolted boxes Y, in which are journaled the ends of the axle of a driving-wheel $A^2$. Behind the wheel $A^2$ on the main frame is mounted the seed-box I and in front of the wheel on said frame is the fertilizer-box L.

V is a draft attachment secured to the front of main frame, and K represents the handles attached to the rear.

M is the front plow or opening-shovel bolted to a curved shank E directly in front of the wheel. This curved shank is bolted to the under side of the front cross-bar G and also to a second cross-bar H at the rear of the fertililizer-box, which forms a strong brace for the opening-shovel.

N N are the rear covering-shovels which are bolted to the rear ends of two curved spring-bars D D. These spring-bars pass along beneath the rear ends of side bars F F and in front are secured to the boxes Y by the same bolts that fasten the boxes to the side bars, the boxes being extended out on one side in the form of flanges for this purpose. The covering-plows N N are arranged in rear of and upon opposite sides of the wheel which runs in the furrow of the opening-shovel, and which rear plows N N throw the earth back into the furrow and cover the seed deposited therein.

On one end of the axle of the running-wheel $A^2$ there is rigidly attached a sprocket-wheel Z, which by means of an endless chain belt J is connected to and turns a sprocket-wheel $Z^2$ on a shaft passing horizontally through the seedbox I. On said shaft, about the middle of the box, is fixed a toothed wheel W, resembling a circular saw, and on each side of it there are fixed to its shaft radial stirring-arms $t$, which stir the cotton-seed and bring them within the influence of wheel W, to be fed by it down through the bottom of the box. The bottom of this seed-box is best shown in Figs. 5 and 6, in which B B are two plates screwed or bolted, respectively, to the two frame-bars F F and rear bar G about two inches apart. Above these plates are adjustable gage-slides $c\ c$, which are slotted and connected to the plates B B by means of set-screws $c'\ c'$. Below these gage-plates $c\ c$ and between the plates B B there is disposed a slide A, which when in place covers the space between the gage-plates $c\ c$ and when withdrawn allows this space to be open immediately below and in the plane of the feed-wheel W. By means of the set-screws $c'\ c'$ this space between the gage-plates may be made wider or narrower and by the slide A it may be cut off or be made longer or shorter to suit the character of the seed or the amount desired to be deposited.

I will now describe the means for distributing the fertilizer. On the side of the wheel $A^2$ there are formed or attached a circular series of projections $p$, which are designed to operate against a vibrating lever O, which is drawn in the opposite direction by a right-angularly-arranged spiral spring P. This lever O is riveted to one corner of a square plate, forming a feed-shoe S in the bottom of the fertilizer-box L. This shoe is supported at its front ends upon flexible straps Q and when shaken by the action of the projections of the wheel $A^2$ on the lever O, in connection with the spring P, it allows a small and regulatable quantity of fertilizer to be fed into the furrow in advance of the seed. When it is not desired to have fertilizer fed, the shoe S is held stationary by a cord $r$ and a pull rod or wire R.

Having thus described my invention, what I claim as new, and desire to secure by Letters Patent, is—

1. In a seed-planter, a seedbox having a bottom composed of two plates B B spaced a distance apart and secured to the bottom of the frame-timber, gage-plates $c\ c$ arranged on the upper side of said bottom-plates and made adjustable toward each other by set-screws $c'\ c'$ and a cut-off slide A arranged beneath the gage-plates in longitudinal position and in the plane of the bottom-plates B B of the seedbox substantially as and for the purpose described.

2. In a seed-planter, a seedbox having a bottom composed of two plates B B spaced a distance apart and secured to the bottom of the frame-timber, gage-plates $c\ c$ arranged on the upper side of said bottom-plates and made adjustable toward each other by set-screws $c'\ c'$, a cut-off slide A arranged beneath the gage-plates in longitudinal position and in the plane of the bottom-plates B B, a shaft passing through the seedbox and having a toothed wheel W in the plane of the opening between the gage-plates with stirring-arms $t$ on each side, and means for rotating said shaft substantially as described.

3. In a seed-planter, the combination of a seedbox I having a bottom composed of two plates B B spaced a distance apart and secured to the bottom of the frame-timber, gage-plates $c\ c$ arranged on the upper side of said bottom-plates and made adjustable toward each other by set-screws $c'\ c'$, a cut-off slide A arranged beneath the gage-plates in longitudinal position and in the plane of the bottom-plates, a shaft passing through the seedbox and having a toothed wheel W in the plane of the opening between the gage-plates with stirring-arms $t$ on each side, a sprocket-wheel $Z^2$ on the end of said shaft, a running wheel $A^2$ in front of the seedbox, with sprocket-wheel Z on the end of its axle, and a chain belt J connecting the sprocket-wheels substantially as described.

4. In a seed-planter, the combination with the front cross-bar G and a second cross-bar H behind the same; of a supporting-shank E for the shovel having the blade attached to its lower end, said shank being curved at its upper end beneath and bolted to both the cross-bars G and H substantially as and for the purpose described.

SIMEON SCOVE CUDD.

Witnesses:
J. H. MCKISSICK,
J. R. HIX.